July 6, 1965     D. W. HILDNER     3,193,310
TUBE COUPLING FOR SHOCK ABSORBERS
Filed Nov. 8, 1963
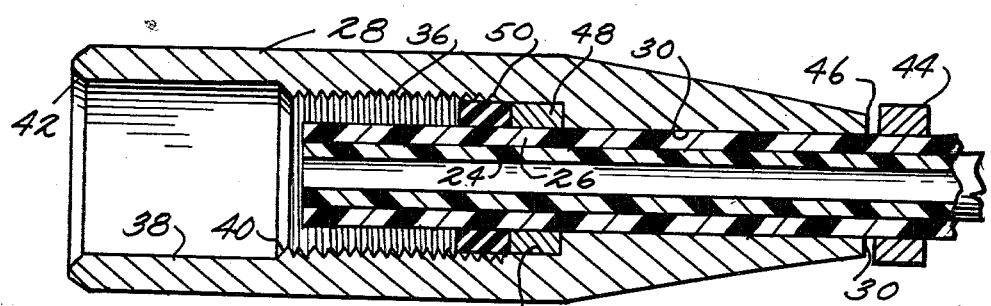
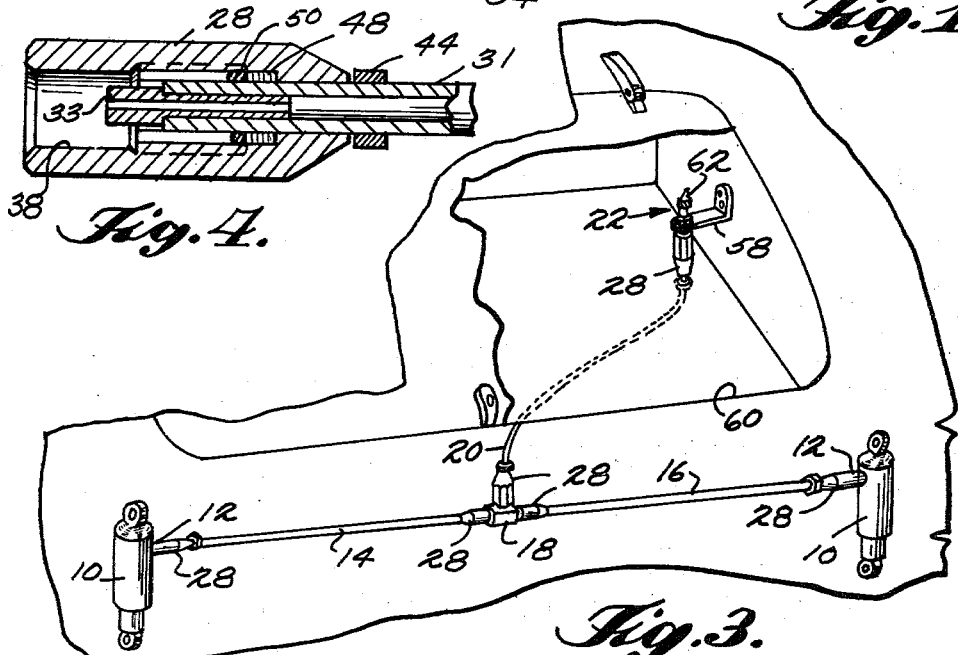
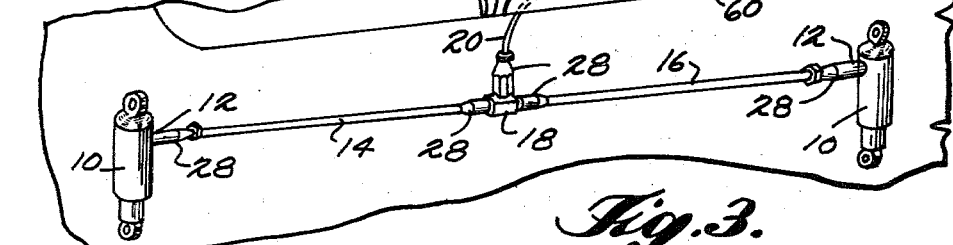
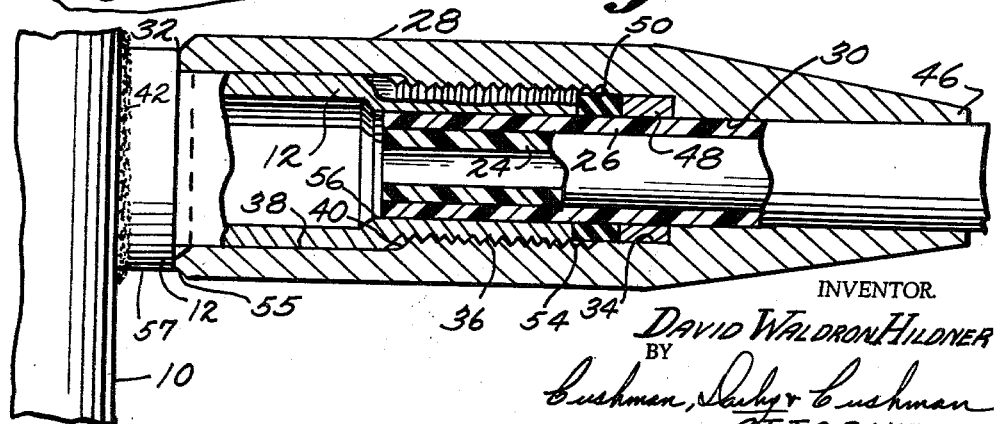
INVENTOR.
DAVID WALDRON HILDNER
BY
Cushman, Darby & Cushman
ATTORNEYS

3,193,310
TUBE COUPLING FOR SHOCK ABSORBERS
David W. Hildner, Cleveland, Ohio, assignor, by mesne assignments, to Maremont Corporation, Chicago, Ill., a corporation of Illinois
Filed Nov. 8, 1963, Ser. No. 322,347
4 Claims. (Cl. 285—27)

This invention relates to shock absorbers and more particularly to an improved system for interconnecting an air supply valve with a plurality of fluid-filled shock absorbers.

A relatively recent innovation in the motor vehicle suspension art is the so-called Load Absorber which combines the best features of conventional shock absorbers with the additional springing of an air cushion or air spring confined within the absorber body. The air spring aids the conventional springs in carrying the vehicle body weight. A typical example of these absorbers will be found in the commonly assigned copending application Serial No. 190,106, filed April 25, 1962 and now Patent No. 3,173,671.

As is disclosed therein the smoothness of ride as well as the levelness of the vehicle associated with these absorbers is dependent upon the amount of air and the air pressure within the absorbers. Previous systems have, therefore, proposed eleborate systems which take air from expensive auxiliary compressors or the like to add to the absorbers.

In contradistinction, the present invention provides an inexpensive, yet adequate and trustworthy, system for adding fluid or removing fluid from load supporting shock absorbers.

Additionally, it is an object of this invention to provide an inexpensive manual system for supplying fluid to absorbers that effectively resists leakage, is conveniently located for use and is adapted for proper operation over a wide temperature range.

These and other objects of the present invention will be more clearly understood from a reading of the following detailed explanation, in which specific reference is made to the attached drawing wherein an illustrative embodiment of the invention is shown, not to limit the scope of the invention, but in order that the principles thereof might be more lucidly set forth.

In the drawing:

FIGURE 1 is a generally schematic view of the trunk area of an automobile equipped with a system embodying the principles of this invention, and showing an air valve communicating with two load supporting shock absorbers;

FIGURE 2 is an enlarged longitudinal sectional view of the novel tube holder employed in the system of FIGURE 1;

FIGURE 3 is an enlarged longitudinal sectional view of the tube holder associated with a load supporting shock absorber; and FIGURE 4 is an enlarged fragmentary sectional view similar to FIGURE 3 showing a modified tube assembly.

Referring to the drawing, two conventional load supporting shock absorbers are generally indicated at 10, having fluid-receiving chambers within (not shown). The absorbers are secured in a conventional manner to a vehicle frame to aid in supporting the weight of the vehicle body and in isolating road shocks therefrom. Fluid, such as air, is supplied to the chamber within each load supporting shock absorber 10 through a suitable nipple, such as the threaded nipple 12 protruding from the side of the body of each absorber 10.

The novel air fill assembly of the present invention includes conduit means 14 and 16 connecting each absorber 10 to a T 18, and conduit means 20 connecting the T 18 with an air fill valve 22.

Experience has shown that the material used in the conduits 14, 16 and 20 must be capable of withstanding variation of temperature over a range extending between −35° F. and 275° F., and variation of pressure over a range extending between 15 and 250 p.s.i.g. In addition, for long life, the conduits should be resistant to oils and greases, to oxidation and to abrasion. According to the invention, it has been found that conduits having the most desirable characteristics mentioned above, as well as reasonable inexpensiveness and flexibility, can be fabricated as double-walled tubing having an inner tube 24 of high density polyethylene, polypropylene or the like, and an outer tube 26 of nylon, i.e., polyhexamethylene adipamide, ε-caprolactam, etc. The double-walled tubing can be formed by conventional methods, i.e., by extruding a nylon sheath over the polyolefin tube or by sliding the polyolefin tube into a previously formed nylon tube. In use, the nylon outer tube 26 protects the inner tube 24 against abrasion damage and allows the composite tubing or conduit to withstand a greater internal pressure than would be possible using a single polyethylene tube of greater thickness. In many applications, especially when the cost of a double-walled tube would be prohibitive, it has been found that the double-walled tube can be replaced by a single layer thick walled nylon tube, a wall thickness of about .06 inch being preferred. As shown in FIGURE 4, a relatively thin walled tube 31 having a wall thickness of about .04 inch can be used provided that an inner, more rigid hollow cylindrical member 33 is inserted in each end thereof to resist the radial compression of the tube 31 as the tube holder is threaded home on the nipple 12.

As shown, each conduct 14, 16 and 20 is completed at each end by a combined tubing holder and fitting 28. Each of the conduits may be of any desired length so that the system can be conveniently arranged with respect to the vehicle. Each holder 28 comprises an elongated member having a longitudinal throughbore 30 of a size to allow each tube holder to be slidably received on the double-walled tubing of a conduit and to embrace the exterior peripheral surface of the outer tube 26. It will be recognized from the drawing that the tube embracing throughbore 30 is elongated with respect to the outside diameter of the tube 26. As best shown in FIGURES 2 and 3, each tube holder 28 has a first counterbore 34 therein, extending toward the outer end 32 of the holder 28. The counterbore 34 is threaded for at least a portion of the length thereof as at 36 and a second counterbore 38 is formed concentric with the first and extends towards the opening of throughbore 30, terminating in an annular shoulder 40 formed with the threaded portion 36 of the first counterbore 34. It will be recognized from the drawing that the counterbore 38 is smooth and of greater length than the threaded portion of the nipple 12. To facilitate assembly, the end 32 of the holder 28 is preferably chamfered adjacent the counterbore 38, as at 42.

Although the holders 28 may advantageously be formed from a number of materials according to established technique, they are most satisfactorily made from molded plastic material, injection molded Delrin (polyoxymethylene) being preferred.

The conduits 14, 16 and 20 are assembled by sliding an annular clamp 44, preferably formed from a material such as aluminum, onto each end of a tubing section, then sliding a holder 28 and a second clamp 48 onto each tubing end. Each clamp 48 is crimped or rigidly secured in place as shown. Each holder 28 then is advanced outwardly until the associated clamp 48 seats in the counterbore. Each clamp 44 is then slid to a position adjacent the inner end 46 of its associated holder and crimped or rigidly secured in place. The clamps 44 and 48 thus act as retainers for the associated tube holders while allowing the holders to rotate on the tubing.

As shown in the drawings, these clamps have cylindrical or smooth inner bores, rather than sharp tube penetrating surfaces. In position, as best shown in FIGURE 2, the tubing projects within the throughbore opening 30 a substantial distance such that its end is at least within the threaded portion 36 of the first counterbore. As shown, a resilient washer 50 is positioned adjacent the clamp 48 so that when the tube holder is threadably received on the nipple 12, on a threaded nipple of the T 18 or on the air valve body 22 and advanced to tightness thereon, the end of the threaded nipple as at 54 will engage and compress the washer 50, thereby expanding it radially and providing a sealing engagement between the outer peripheral surface of the outer tube 26 and the end 54 of the threaded nipple. The sealing effected at the T 18 and the valve body is similar in essential respects to that effected at the absorber nipple. The annular surface 55 on the circumferential boss 57 provided on the nipple 12 adjacent the absorber body acts to determine the inward movement of the holder 28 as the shoulder 32 abuts the surface 55. This feature thus predetermines the squeezing of the resilient seal 50.

As best shown in FIGURE 3, when the tube holder 28 is secured to the nipple 12, the portion of the tube initially within the threaded portion 36 of the counterbore now is slidably received within the smooth throughbore 56 of the threaded nipple and the inner peripheral surface of the tube holder second counterbore 38 closely engages the smooth outer periphery of the threaded nipple 12 in the area spaced toward the absorber body 10 from the threaded engagement of the nipple and tube holder. It has been found that this configuration is mechanically strong and very resistant to fluid leakage in the above-mentioned pressure and temperature ranges.

The remainder of the air fill system according to the invention includes a conventional pneumatic-tire-type air filler valve housed in a suitable body 22 and secured by means such as a bracket 58 to the vehicle in a convenient location, such as within the luggage compartment 60, as shown.

When the vehicle user wishes to add fluid to the absorbers in order to accommodate a heavier load in the vehicle or to increase the height of the vehicle, he may simply remove the air valve cap 62 and connect the valve to an air pump, for example a hand pump or a compressor-driven pump, such as that found at most gasoline filling stations. The added air moves through the valve 22 and conduit 20 to the T 18 where it divides and is supplied through the conduits 14 and 16 to the air chambers within the load absorbers 10. Conversely, when the removal of air is desired, the user simply depresses the stem of the valve 22 until the desired amount of air has been released.

It should now be realized that the principles of the present invention have been explained as to fully accomplish the objects of the invention outlined above. Additionally, it should be apparent that whereas an embodiment of the invention has ben shown to illustrate the principles thereof, many modifications may be made without departing from these principles. Therefore, the extent of the present invention should be limited only by the spirit and scope of the claims appended hereto.

I claim:
1. A coupling comprising an elongated holder member having a bore therethrough including a first through bore and a counterbore in one end portion thereof defining an annular shoulder facing in the direction of said one end, said counterbore having a first smooth portion adjacent said annular shoulder, a threaded portion adjacent said smooth portion and an enlarged smooth portion between the threaded portion and said one end, a length of flexible plastic tubing of a size to slidably engage within said first through bore, said first through bore being of greater length than the diameter of said tubing, a smooth bore collar rigidly secured about said plastic tubing at a position spacer inwardly from one end thereof and being of a size to be received within said counterbore in engagement with said annular shoulder, a rigid nipple member having an interior periphery of a size to receive the one end of said plastic tubing therein through one end portion thereof, the one end portion of said nipple member having an exterior periphery of a size to engage within the enlarged smooth portion of said counterbore, annular resilient seal means radially deformable in response to longitudinal compression having an interior periphery of a size to engage the outer periphery of said plastic tubing in abutting relation outwardly of said collar and an exterior periphery of a size to engage within said first smooth counterbore portion, the outer periphery of said nipple member having threads thereon interengaging with said threaded portion of said counterbore, the enlarged smooth portion of said counterbore being of greater length than the threads on said nipple member to provide a mechanically strong construction, the interengagement of said threads being operable in response to a relative turning movement between said members to effect a longitudinal compression of said seal means between said collar and the end of said nipple member to thereby radially deform said seal means into pressure tight engagement with said counterbore and the exterior periphery of said tubing, and stop means on the exterior periphery of said nipple member spaced from said one end thereof engageable by the adjacent end of said holder member for limiting the amount of longitudinal compression of said seal means.

2. A coupling as defined in claim 1 including a second collar rigidly secured about said plastic tubing at a position adjacent to the adjacent end of said holder member.

3. A coupling as defined in claim 1 including a separate rigid hollow member engaged within the one end of said plastic tubing and extending therein to a position at least longitudinally coextensive with said seal means.

4. A coupling as defined in claim 1 wherein said holder member is composed of polyoxymethylene.

References Cited by the Examiner
UNITED STATES PATENTS

| | | | |
|---|---|---|---|
| 616,808 | 12/98 | Ricketts | 285—248 |
| 1,334,682 | 3/20 | Snell | 285—249 |
| 1,637,628 | 8/27 | Weisgerber | 285—27 |
| 2,152,537 | 3/37 | Couty | 285—247 |
| 2,755,110 | 7/56 | Jacobs. | |
| 2,787,480 | 4/57 | Staller | 285—238 |
| 2,869,883 | 1/59 | Dunbar | 285—354 X |
| 2,908,512 | 10/59 | Morrow | 285—354 X |
| 3,025,086 | 3/62 | Mosely | 285—250 |
| 3,046,001 | 7/62 | Schultze. | |
| 3,129,022 | 4/64 | Avery | 285—249 |
| 3,140,107 | 7/64 | Hynes | 285—354 X |

FOREIGN PATENTS

| | | |
|---|---|---|
| 562,553 | 12/57 | Belgium. |
| 1,026,074 | 1/53 | France. |
| 1,237,522 | 6/60 | France. |
| 749,530 | 1/45 | Germany. |
| 11,725 | 5/03 | Great Britain. |
| 1,707 | 8/06 | Great Britain. |
| 829,069 | 2/60 | Great Britain. |

CARL W. TOMLIN, *Primary Examiner.*
ARTHUR L. LA POINT, *Examiner.*